Nov. 25, 1969   D. P. SMITH   3,480,774
LOW-ENERGY ION SCATTERING APPARATUS AND METHOD FOR
ANALYZING THE SURFACE OF A SOLID
Filed May 26, 1967   4 Sheets-Sheet 1

INVENTOR.
DAVID P. SMITH
BY
Carpenter, Kinney & Coulter
ATTORNEYS

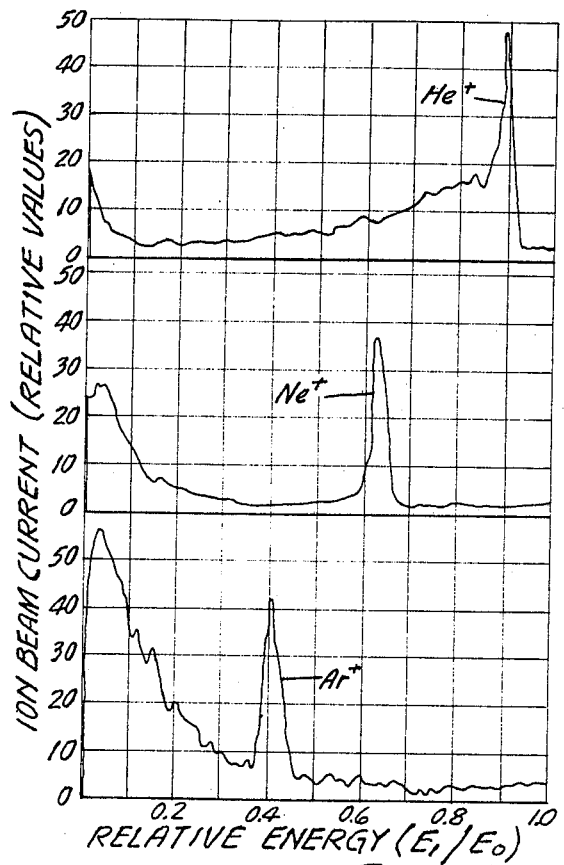
FIG. 3A
FIG. 3B
FIG. 3C
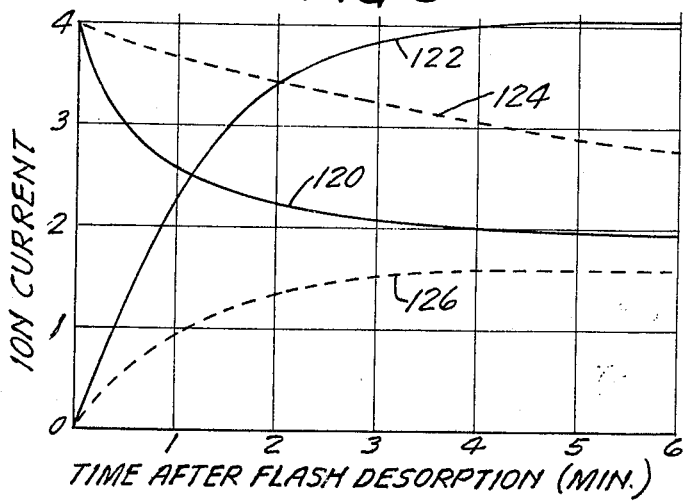
FIG. 5

INVENTOR.
DAVID P. SMITH
BY
Carpenter, Kinney & Coulter
ATTORNEYS

United States Patent Office 3,480,774
Patented Nov. 25, 1969

3,480,774
LOW-ENERGY ION SCATTERING APPARATUS AND METHOD FOR ANALYZING THE SURFACE OF A SOLID
David P. Smith, Cottage Grove, Minn., assignor to Minnesota Mining and Manufacturing Company, St. Paul, Minn., a corporation of Delaware
Filed May 26, 1967, Ser. No. 641,582
Int. Cl. H01j 37/00
U.S. Cl. 250—49.5
12 Claims

ABSTRACT OF THE DISCLOSURE

Apparatus and method for analyzing a solid surface utilizing a low-energy primary ion beam with ions of known mass, charge and energy by directing the primary ion beam onto the solid surface to be analyzed whereby said primary ions from said beam are scattered from the elements forming the solid surface and the quantity and energy of the scattered ions are analyzed during a predetermined time interval and are used to determine the elements and quantity of elements forming the solid surface.

---

It is known to analyze the surface of a target element with an ion beam. An example of the prior art includes Patent No. 2,947,868. In Patent No. 2,947,868 a primary ion beam is used to sputter atoms from the target surface. The ionized sputtered atoms are subsequently passed through a plurality of analyzing stages where the sputtered ions are analyzed to identify the atoms formerly on the target surface. A similar ion sputtering analysis technique is disclosed in Patent No. 2,976,413.

It is also known to scatter high-energy ions, derived from an inert, noble gas, from a target surface and at a relatively large angle therefrom to determine the charge state and energy of a scattered primary ion resulting from such a collision. The energy of the scattered primary ion was interpreted in terms of a binary-elastic collision model. This high-energy ion scattering technique, wherein the ion energy is in the order of 40 kev. to 80 kev., is disclosed by Sheldon Datz and Cornelis Snoek, in an article entitled "Large-Angle, Single-Collision Scattering of Argon Ions (40–80 kev.) from Metals," Physical Review, volume 134, No. 2A, Apr. 20, 1964.

A magnetic spectrometer disclosed in Patent No. 3,084,249 can be used in scattering mass spectroscopy wherein elastic scattering is employed for mass measurement. In this spectrometer, the target is bombarded by an artificially accelerated beam of charged particles such as high-energy deuterons having an energy in the order of 6 mev. The high-energy particle beam penetrates deeply into the target and most of the beam particles are scattered off the nuclei lying some distance below the target surface. The particles, during collision with the target atom nucleus, are scattered through a given angle wherein the recoil energy of the scattered particle is measured. Depending on the mass of the nuclei in the target with which the bombarding particles have collided, the energy of recoils will vary and the specific target element could be determined by measurement of the recoil energy of the bombarding deuteron beam.

The several uses of an ion beam for analyzing a solid surface or a target element disclosed in the prior art have several disadvantages. For example, in Patent No. 2,947,868, the bombarding high-energy primary ion beam has an energy in the order of 20 kev. The high-energy ion beam quickly sputters away and ionizes elements from the surface to be analyzed. Consequentially, no single surface condition persists long enough to allow its determination. The sputtered or released ions are drawn from the sample being analyzed, passed through various apertures and the like to form an ion beam comprising only the sputtered ions. The sputtered ion beam is mass analyzed by a suitable magnetic analyzer and detector system. In such apparatus, the scattered ions from the primary ion beam are intentionally rejected by the lens system which deflects the sputtered ions into the magnetic analyzer. This particular apparatus has the disadvantage of requiring a relatively high-energy ion beam and a relatively sophisticated lens system for collimating and forming an ion beam from the sputtered ions. Also, a sufficient quantity of surface atoms must be removed to form a sputtered ion beam which is capable of being detected and analyzed. Further, such a high-energy beam penetrates into and destroys the particular surface being analyzed. The mass spectrometer described in Patent No. 2,976,413 has similar disadvantages.

Analyzing the atoms on the solid surface by elastically scattering ions off the target surface described in the article by Datz and Snoek has serious disadvantages. The primary ion beam being scattered is required to have an energy in the order of 40–80 kev. Such a relatively high-energy ion beam exhibits "multiple charge stripping" during scattering, has a relatively deep penetration capability and causes considerable removal of surface atoms. Further, the probability of scattering at a given angle decreases with increasing energy. Consequently, a small percentage of the primary ions are scattered into the detector. A large percentage of the scattered primary ions exhibit "multiple charge stripping" whereby such ions have 1 to 4 electrons stripped therefrom. Therefore, an energy spectrum derived from scattered high-energy ions exhibits several distinct peaks. The many peaks for a single target atom due to "multiple charge stripping" make analysis of the energy spectrum ambiguous and inaccurate.

The magnetic spectrometer of Patent No. 3,084,249 requires an extremely high-energy particle beam for analysis. Further, bombardment of the target by the high-energy beam results in the disadvantage of a nuclear reaction occurring from which both corpuscular and electromagnetic radiation are emitted in all directions. The high-energy particle beam penetrates deeply into the target surface whereby the surface atoms are destroyed and the atoms under the surface atoms are analyzed.

The low-energy ion analyzing apparatus and method of the present invention, in one embodiment, uses a primary ion beam comprising noble gas ions. In a preferred embodiment, the ion beam has an energy of less than about 3 kev. Such a low-energy primary ion beam only slightly penetrates the surface of the target to be analyzed. Further, any sputtering of the target surface occurs at a relatively slow rate such that the sputtering rate, surface thickness and elements can be accurately analyzed. For example, at the beginning of surface analysis, the scattered ion energy spectrum has energy peaks which clearly identify the elements and determine their abundance on the target surface. Such energy peaks occur for a relatively long time interval due to the slow sputtering rate thereby permitting an accurate determination of the abundance and mass of each type of surface atom. As the sputtering progresses, the scattered ion energy peaks shift from identify the elements initially on the target surface to identifying the target itself. For example, one use of the ion scattering technique of the present invention is to determine the thickness of an oxide layer on the surface of an aluminum target.

The low-energy scattering analysis technique of the present invention has broad application for analyzing the surface of a solid. When the energy of the primary ion beam is less than about 3 kev. but is of sufficient energy such that single binary collisions occur, energy analysis of the scattered ion beam can be used to exactly identify the mass of each type of a surface atom.

In some instances the primary ions have such low energy that the collision processes cannot be interpreted in terms of a simple two-body elastic collision model. When this occurs a more complicated collision model, generally referred to as a multi-body collision model, is employed. Hereinafter the term "three-body" collision or effect shall be used to indicate a multi-body collision between an incident ion and more than one target atom.

When the three-body effect occurs, the mass of each type of surface atom cannot be determined with complete precision. However, the ions scattered from an ion beam due to a three-body effect can be used to empirically identify whether or not a surface being analyzed is generally composed of atoms with a particular mass. Thus, ions of a primary ion beam scattered by a three-body collision can be used to recognize a particular surface condition.

In any event, when the energy level of the primary ion beam is less than about 3 kev., the surface of a solid can be analyzed. Generally, when the energy level is less than about 3 kev. but greater than the primary ion energy required to produce the two-body effect, the mass of the surface atoms can be accurately determined. When the energy level of the primary ion beam is less than the energy required for the two-body effect, but greater than the binding energy of the surface atom, the three-body effect becomes operative and can be used for providing valuable information about the surface to be analyzed.

The use of a low-energy primary ion beam overcomes the above-noted disadvantages of the prior art devices. In particular, the low-energy ion beam used in the present invention has the advantage of operating at a substantially lower energy than the mass spectrometer described in Patent No. 2,947,868, the apparatus described in the article by Datz and Snoek and the nucleus scattering particle beam of Patent No. 3,084,249.

The low-energy ion beam analyzing technique utilized in the present invention results in substantial improvement in accuracy of surface analysis relative to the technique or method described in the article by Datz and Snoek. The low-energy ion beam used in the present invention has such a low energy level that "multiple charge stripping" effects are negligible whereby extra peaks in the energy spectrum due to "multiple charge stripping" are eliminated. Further, the use of a low-energy ion beam of the present invention has the advantage of minimizing the damage to the surface being analyzed.

Therefore, the primary advantage of the low-energy ion analyzing apparatus of the present invention is that an elemental analysis of a solid surface can be obtained.

An additional advantage of the present invention is that a novel and unique method can be utilized for analyzing the surface of a solid.

A further advantage of the low-energy ion scattering apparatus and method of the present invention is that the surface of a solid can be analyzed to determine if the surface is free of contamination. Alternatively, the identity and quantity of each element forming the surface of the solid can be accurately determined.

Another advantage of the present invention is that the target surface to be analyzed can be selectively sputtered at a relatively slow rate permitting accurate determination of surface elements and thickness whereby a compositional profile having a resolution of monomolecular dimension can be achieved.

Yet another advantage of the present invention is that the sputtering rate of particular elements or contamination rate of a clean surface can be accurately determined by using low-energy ion beams.

These and other advantages of the present invention become apparent and can be best understood from the following detailed description taken together with the following drawing wherein:

FIGURES 3A, 3B and 3C are graphs illustrating typical energy distributions for three low-energy nobel gas ion beams ejected at 90° from a polycrystalline molybdenum ribbon;

FIGURE 5 is a graph illustrating the counting rate of scattered and sputtered ions starting with an atomically clean surface obtained by flash desorption in a contaminated atomsphere plotted as a function of time flash desorption;

Figure 1:
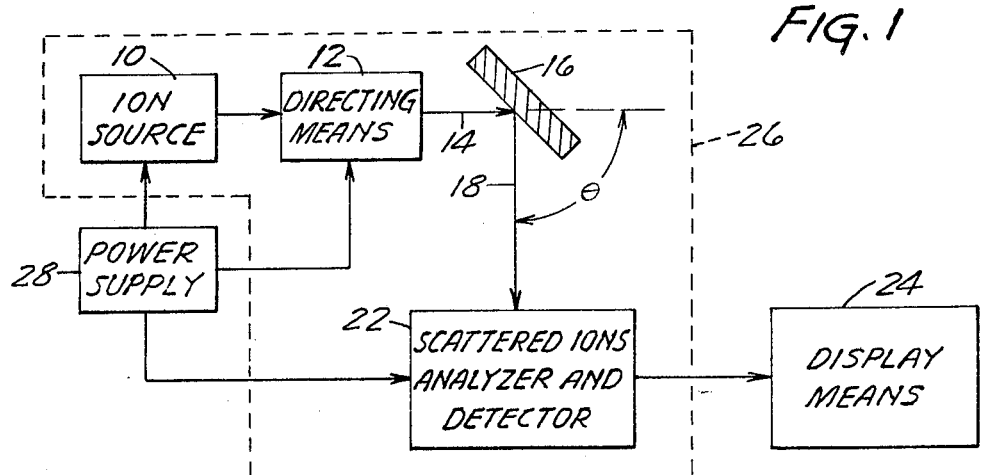
FIGURE 1 is a block diagram and a partial pictorial diagram illustrating the present invention.

Briefly, this invention discloses an energy spectrometer or apparatus and method for the elemental analysis of a solid surface with a scattered low-energy ion beam. The apparatus includes means for generating a low-energy ion beam substantially homogeneous in mass and energy. Means cooperating with the generating means are provided for directing the ion beam onto the solid surface to be analyzed whereby ions from the primary ion beam are scattered from the solid surface. Means positioned at a predetermined angle relative to the ion beam are utilized for analyzing the energy and quantity of ions scattered from the solid surface during a predetermined time interval to determine the elemental composition of the solid surface.

The method disclosed for analyzing the solid surface atomic composition with a low-energy ion beam briefly requires the steps of generating a low-energy ion beam substantially homogeneous in mass and energy, directing the ion beam onto the solid surface to be analyzed whereby ions from the primary ion beam are scattered from the solid surface, and analyzing and counting at a predetermined angle relative to the ion beam the quantity of ions scattered from the solid surface within a predetermined energy during a predetermined time interval to indicate the elemental composition of the solid surface.

Analysis of a surface based on binary-elastic collision theory and scattering of a low-energy ion beam is contingent upon the understanding of the interaction which occurs between a primary ion which is scattered upon collision with an element forming the solid surface. Thus, in one aspect of the present invention, the low-energy ion analyzing technique of the present invention can be used to identify the mass and determine the quantity of an element forming the surface of a solid. The mass of the elements forming a target surface can be quantitatively determined from mathematical equations which relate the energies, masses and scattering angles involved in the collisions. The mathematical equations which have been experimentally verified can be derived based on the following assumptions.

First, it is assumed that the target atoms are essentially unbound from their neighboring atoms. Thus, during collision the target atoms behave independently as though they were gas atoms. Generally, the estimated collision times between the primary ion and the target atom are in the order of $10^{-16}$ to $10^{-15}$ seconds. The characteristic lattice vibration times, dependent on the binding characteristics of neighboring atoms, are in the order of $10^{-13}$ seconds. Therefore, the short collision times between the primary ions and the target atom, of the element to be identified, relative to the lattice vibration time permit the target atoms to behave as if they were unbound from their neighboring atoms during such collision.

Second, it is assumed that the target atoms are substantially stationary before collision with a primary ion. In such an assumption, the target atom vibration energy in a solid at ambient room temperature is about 0.04 ev. A vibration energy in the order of 0.04 ev. can be neglected in the ion beam scattering analysis of the present invention.

Third, the energy losses of the primary particle during collision with a target atom are assumed to be completely kinetic. Thus, the electronic interaction energy transfer between the primary ion and the target atom can be neglected since the energies are generally small.

Based on these three assumptions, a prediction of the postcollision energies of the primary particles can be determined in terms of scattering angles, mass ratio and precollision energies. Most importantly, this is accomplished without recourse to adjustable or empirical factors.

In this invention, if, for example, the mass ratio of the primary ion to the target atom is greater than 1, then based on the above assumptions together with application of the principle of conservation of energy and momentum to the colliding particles, the following equation for the energy of a singly scattered ion can be derived:

(1) $\quad E_1/E_0 = (1+\alpha)^{-2}[\cos\theta + (\alpha^2 - \sin^2\theta)^{1/2}]^2$ The energy of the target atom can be determined from the following equation:

(2) $\quad E_2/E_0 = 4\alpha(1+\alpha)^{-2}\cos^2\phi$

In each of the above Equations 1 and 2, the variables are identified as follows:

$m_1$ = mass of primary ion
$m_2$ = mass of target atom
$E_0$ = kinetic energy of $m_1$ before collision
$E_1$ = kinetic energy of $m_2$ after collision
$E_2$ = kinetic energy of $m_2$ after collision
$\theta$ = angle of scattering of $m_1$
$\phi$ = angle of scattering of $m_2$
$\alpha$ = mass ratio = $m_2/m_1$ A similar equation for mass ratio less than 1 can be derived by those skilled in the art.

For purpose of example, Equation 1 for the case where $m_2 > m_1$ can be simplified by proper selection of the angle $\theta$.

For the special case of $\theta = 90°$, Equation 1 becomes:

(3) $\quad E_1/E_0 = \dfrac{m_2 - m_1}{m_2 + m_1}$ (3) when solved for $m_2$ yields:

(4) $\quad m_2 = m_1 \dfrac{1 + E_1/E_0}{1 - E_1/E_0}$

When a simple two-body analysis is conducted, EQN (4) is used to calculate $m_2$ which is the unknown. The mass $m_1$ is known and the value of $E_1/E_0$ can be derived from the scattered ion energy spectrum peak.

Apparatus for analyzing a solid surface with a scattered low-energy ion beam is illustrated in FIGURE 1. The apparatus includes means for generating a low-energy ion beam substantially homogeneous in mass and energy generally illustrated as ion source 10. Ion source 10 may comprise any known means for generating an ion beam homogeneous in mass and energy. For example, ion source 10 may be a gaseous discharge ion source which includes duoplasmatron ion sources, a cold-cathode gas discharge device, a surface ionization device and the like. Also, the ion source 10 may comprise, for example, an electron bombardement ion source or any other known sources.

In the preferred embodiment, the energy of the ion source should be less than about 3 kev. Means, generally designated as 12, cooperating with the generating means is utilized for directing the primary ion beam, designated as 14, along a preselected path onto the solid surface of a target 16. The directing means 12 generally includes means for focusing the ion beam and any magnetic sector or electrostatic fields for purifying the ion beam. Ions, generally designated as 18, from the primary ion beam 14 are scattered from the solid surface of target 16.

A means, generally designated as 22, for analyzing during a predetermined time interval the energy and quantity of ions 18 scattered from the solid surface, is positioned at a predetermined angle, e.g. $\theta$, relative to the ion beam 14. The means 22 may be any single known means which concurrently measures energy and quantity of ions such as, for example, a stack of photographic film whereby ion penetration indicates ion energy and film exposure indicates ion quantity. Also, the means 22 could comprise, for example, an energy analyzer for measuring the ion energy in any combination with an ion detecting means. Typical energy analyzers would include electrostatic energy analyzers, magnetic energy analyzers, time-of-flight energy analyzers and the like. Ion detecting means for use in practicing this invention would include such devices as electron multipliers, electrometers, photographic film and the like.

The angle of scatter of the ions, the energy of the scattered ions and the number of scattered ions can be measured. The measured values can be verified or unknowns determined by considering the collision between the low-energy ion beam homogeneous in mass and energy and the solid surface of the target as a simple binary-elastic collision. Equations 1 and 2 may be used for this determination.

An energy spectrum which is a function of the energy and quantity of ions 18 scattered from the surface of target 16 can be produced. A display means 24 may be used for generating such an energy spectrum and the display means 24 is electrically connected to the energy analyzer and detector 22. The dashed area 26 is maintained at a predetermined vacuum by means of a vacuum pump (not shown) and a power supply 28 energizes the various components including the ion source 10, the directing means 12 and the analyzer and detector 22.

Figure 2:
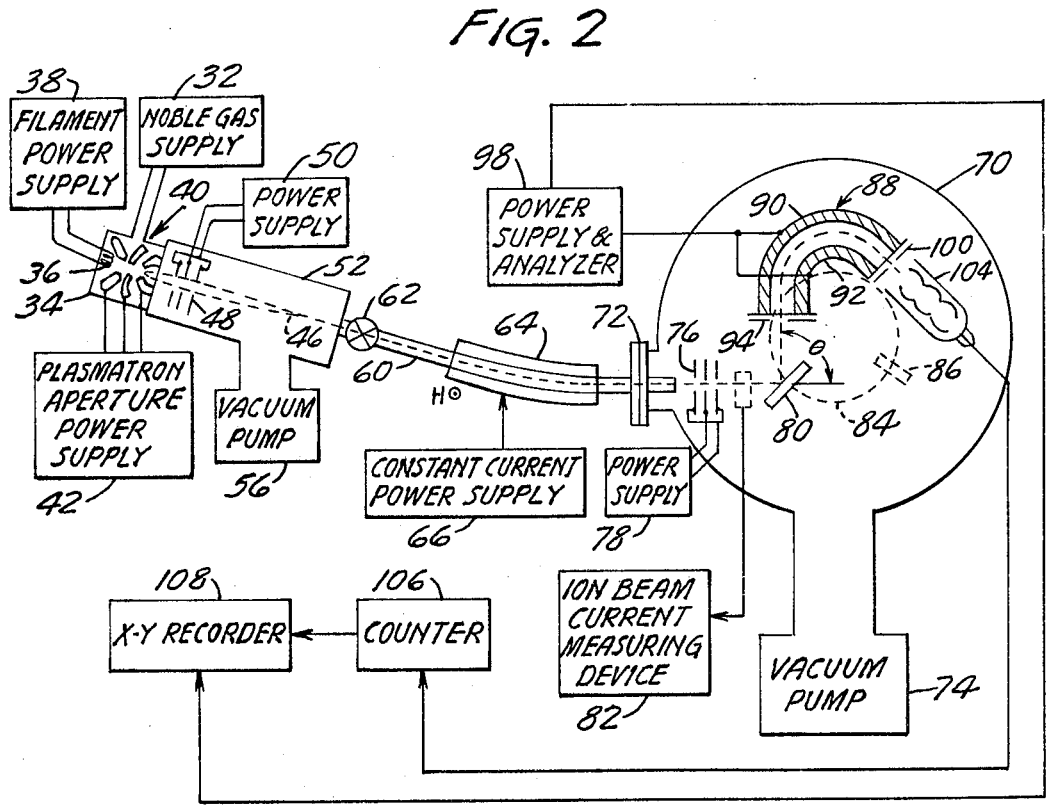
FIGURE 2 is a diagrammatic representation illustrating one embodiment of apparatus for analyzing a solid surface with a scattered low-energy ion beam.

FIGURE 2 discloses one embodiment of apparatus for analyzing a solid surface with a scattered low-energy ion beam. In the preferred embodiment, the primary ion beam used herein may be formed from an inert gas selected from the group consisting of helium (He), neon (Ne) and argon (Ar). Further, the energy level of the primary ion beam should be less than about 10 kev. and preferably less than about 3 kev. A noble gas selected to form the ion beam, such as for example helium, neon or argon, is carried from a noble gas source 32 into an ion source 34. The ion source 34 may comprise any known ion source, such as for example a duoplasmatron-type ion source. In the duoplasmatron-type ion source 34, electrons are emitted from a hot filament 36 energized by a filament power supply 38. The electrons emitted by filament 36 are accelerated by means of a potential existing between the filament 36 and duoplasmatron apertures, generally designated as 40. The duoplasmatron apertures 40 are energized from a duoplasmatron aperture power supply 42.

The accelerated electrons emitted by filament 36 collide with the noble gas atoms from the noble gas source 32 causing positive ionization of the atoms. The positive ions are formed into an ion beam 46 by means of an electric field (not shown) which is known in the art. The primary ion beam is focused by means of an einzellens 48 which is energized from a power supply 50. The einzellens 48 is located within a beam housing 52 enclosing the duoplasmatron aperture 40 and filament 36. A vacuum pump 56 maintains a vacuum in the vicinity of the beam housing 52, duoplasmatron apertures 40 and filament 36 in the order of $10^{-6}$ torr.

A beam tube 60 having an aperture therethrough is operatively connected to the beam housing 52 and contains therein a metal ball valve 62 which may be used to close off the ion source and vacuum pump 56 from the rest of the apparatus. The einzellens 48 focuses the primary ion beam 46 such that the primary ions homogeneous in energy are directed along a preselected path through the beam tube 60.

To insure that the primary ion beam is homogeneous in mass and energy, the focused primary ion beam is passed through a purifying means, such as for example a sector magnetic field or magnetic separator 64. In one embodiment, magnetic separator 64 deflects the ion beam approximately 20°. The ions having the desired mass-to-charge ratio are deflected by the magnetic separator 64 through the center of the curved beam tube 60 into a scattering chamber 70. The magnetic separator 64 is capable of generating a static magnetic field in the order of from about 0 kilogauss to about 2 kilogauss. This field is sufficient to deflect primary ions with a mass-to-charge ratio of over 40 (argon) and up to 3 kev. in energy into the scattering chamber 70 onto target 80. The magnetic separator 64 is powered by a constant current power supply 66 to provide a primary ion beam 14 having a relatively constant current intensity and mass. In addition, the magnetic separator 64 includes means for varying the direction of the deflection magnetic field thereby allowing maximization of the primary ion beam current passing through the beam tube 60.

The beam tube 60 is sealed by means of a port 72 into an opening located on the periphery of scattering chamber 70. The scattering chamber 70 in one embodiment was approximately 12 inches (about 30 cm.) in diameter and was constructed from stainless steel. A relatively high vacuum is maintained in the scattering chamber 70 by means of conventional vacuum pumps and valves, generally designated as 74. In one embodiment, the scattering chamber 70 was pumped to a vacuum pressure generally in the order of $10^{-9}$ to $10^{-5}$ torr pressures. The vacuum pump 74 may be a 40 liter/second ion pump cooperating with a 4-inch (approximately 10 cm.) liquid nitrogen trapped oil diffusion pump. Pressure measurements, in one embodiment, were made using a Bayard-Alpert type ionization gauge (not shown).

The diameter of the primary ion beam emanating from beam tube 60 may, if desired, be selectively varied by means of a second einzellens 76 which is energized from a power supply 78. The focal length of lens 76 can be selectively varied to control the cross-section of the primary ion beam on the target 80. Use of a device such as lens 76 provides a means for selectively varying the ion beam current density at a constant beam current. The primary ion beam focused by the second einzellens 76 is directed along a preselected path to bombard the solid surface of a target 80 to be analyzed. In one embodiment, a helium ion beam having a current in the order of $10^{-7}$ A. and an energy in the order of 1.8 kev. had its ion current density varied from about 1 to about 100 $\mu$A./cm.² and was used to bombard a target comprising molybdenum (Mo). The current intensity of the ion beam 46 can be measured by an ion beam current measuring device, generally designated 82. The target 80 could be one of a plurality of targets located on a means for selectively positioning a target at a predetermined angle $\theta$ to the ion beam 46, which means is generally designated as 84. A second target designated by dashed box 86 may be supported by the positioning means 84 such that rotation of the positioning means advances and locates the alternate target 86 in position to be bombarded by the primary ion beam focused thereon by the einzellens 76.

The target 80 and the alternate target 86 can be selectively mounted on the positioning means 84 such that the angle of incidence of the beam with respect to the target surface or the scattering angle $\theta$ can be selectively controlled.

When the primary ion beam 46 bombards the solid surface of target 80, a fraction of the ions are scattered at a preselected angle $\theta$. In the embodiment being described, an energy analyzer 88 having analyzer plates 90 and 92 is positioned at a predetermined angle to the target surface such that the scattered ion beam scattering at the preselected angle $\theta$ passes through an entrance slit 94 of energy analyzer 88. Potential from a power supply 98 is impressed upon analyzer plates 90 and 92 in a normal manner such that ions having a predetermined energy-to-charge ratio are deflected along a predetermined trajectory, for example, in a circular trajectory, with no net acceleration in the radial direction. In this embodiment, the energy analyzer 88 is an electrostatic analyzer and is constructed such that the positive ions scattered from the target are deflected through approximately 127°. Thus, the energy analyzer 88 is positioned at a predetermined angle $\theta$ relative to the primary ion beam 46. The potential applied to the energy analyzer deflects ions having a predetermined energy-to-charge ratio along a predetermined trajectory so as to deflect, over a predetermined time interval, the scattered ions having the predetermined energy-to-charge ratio through an exit slit 100 of energy analyzer 88.

Means are provided for detecting the scattered ions and for generating electrical pulses indicative of the number of ions at any preselected time. For example, one such detecting means is a 10-stage electron multiplier 104 which is positioned relative to the exit slit 100 of energy analyzer 88 to detect the individual ions. The energy analyzer 88 and electron multiplier 104 are mounted on a platform (not shown) which can be selectively adjusted or rotated about the scattering center of target 80.

The output from the electron multiplier 104 may be fed to an electronic counter 106 for counting the number of ions over the predetermined time interval. The electronic counter 106 in turn generates an output signal, such as for example an analog or direct voltage signal, which may be fed to an output device such as an XY recorder 108, which may be for example a strip chart, oscilloscope and the like. An energy spectrum can be produced by plotting the output of the electronic counter 106 as a function of the voltage applied to the analyzer plates 90 and 92. The power supply 98 applies an output signal, such as for example an analog signal, to the XY recorder 108 representing the energy of the ions passing through the energy analyzer 88. The resulting energy spectrum can be interpreted to indicate the elemental composition of the solid surface.

By recording the scattered ion counting rate from the counter 106 as a function of ion energy during a time when the primary ion beam is maintained relatively stable, an energy distribution measurement can be made in about 5–30 seconds depending on the preselected time constants of the detecting circuits. In this procedure the X axis of the XY recorder 108 is driven by a fraction of the energy applied by the energy analyzer 88 and the Y axis of the XY recorder 108 is driven by the counter 106.

A novel and unique method for analyzing a solid surface atomic composition with a low-energy ion beam is obtained using, for example, the apparatus of FIGURE 2. The method for analyzing the outer surface of a solid with a low-energy ion beam includes generating a low-energy ion beam 46 homogeneous in mass and energy, directing the ion beam 46 along a preselected path onto the solid surface of target 80 whereby ions from the primary ion beam 46 are scattered from the solid surface, and analyzing and counting at a predetermined angle, for example $\theta$, the quantity of ions scattered from the solid surface within a predetermined energy band during a predetermined time interval to indicate the atomic composition of the surface.

In the above-described embodiment, the scattered ions are deflected such that the ions having a predetermined energy-to-charge ratio are deflected along the predetermined path through an energy analyzer while all other ions are rejected. Counting the number of scattered ions deflected along the predetermined trajectory indicates the quantity of ions having a predetermined energy-to-charge ratio and mass-to-charge ratio. By plotting the number of counted ions having a predetermined energy-to-charge ratio as a function of the ion energy-to-charge ratio, an energy spectrum can be produced having high-energy peaks representative of the masses and abundance of the atoms scattering the ions from the solid surface being analyzed.

When the above method is used to generate an output spectrum having a plurality of peaks, the energy of each peak can be used, for the case of 90° scattering, to calculate the mass of the target atom $m_2$ using Equation 4.

The apparatus described in FIGURE 2 was utilized for scattering of 1.8 kev. positive noble gas ions of $He^+$, $Ne^+$ and $Ar^+$ for bombarding and analyzing a polycrystalline molybdenum surface. In this example, the target consisted of a planar molybdenum ribbon approximately .0015 inch (about $40\mu$) thick mounted in a target holder at the center of the scattering chamber. An energy distribution of positive ions scattered at a 90° angle, i.e. $\theta = 90°$, with respect to the primary ion beam direction, was obtained. Prior to bombardment, the molybdenum ribbon was resistively heated to about 2000° K. for several seconds. When the ambient pressure within the scattering chamber 70 had returned to its initial value, say in the order of about $10^{-7}$ torr, the resistive heating was discontinued. Thereafter, the surface of the molybdenum ribbon was analyzed with the ion beam and an energy spectrum was obtained within about 15–30 seconds. The current-density controlling einzellens 76 was not used and the diameter of the ion beam emanating from the beam tube 60 was in the order of 3 mm. with a primary ion beam current in the order of $10^{-7}$ A.

The graphs of FIGURES 3A–3C illustrate the energy spectrum resulting from bombarding the molybdenum sample with a primary ion beam of $He^+$, $Ne^+$ and $Ar^+$ respectively. The graphs of FIGURES 3A–3C were obtained by plotting the scattered ion current in relative values as a function of relative energy $(E_1E/_0)$. In each of the enetrgy spectra, two distant energy groups of ions were observed. Generally, the lowest energy group of ions is attributed to ionized sputtered (multiple collision events) surface atoms from the molybdenum surface.

In the graph of FIGURE 3A, the maximum of the low-energy group of ions due to the molybdenum sample being bombarded by the $He^+$ primary ion beam was in the order of 5–15 ev. Ions observed by this experiment appeared to correlate with other measurements used to determine the velocity of neutral sputtered atoms. Such low-energy sputtered ions are ejected by complicated and not well-understood surface collisions and are of little analytical value except, for example, as a source of ions disclosed in U.S. Patent Nos. 2,947,868 and 2,976,413.

Similarly, the graphs of FIGURES 3B and 3C demonstrated a grouping of low-energy sputtered ions.

The graphs of FIGURES 3A–3C each have a relatively high-energy peak which is strongly dependent on the mass ratio between the primary ions of the ion beam and molybdenum atom.

Using Equation 3 (which is a special case of Equation 1 for $\theta = 90°$, one can calculate the theoretical ratio of energies for each of the bombarding ion beams. The primary masses or $m_1$ or $He = 4$, $m_1$ for $Ne = 20$, and $m_1$ for $Ar = 40$. The primary mass of $m_2$ for $MO = 96$. Thus, $\alpha = 24$ for the $He^+$ ions, 4.8 for the $Ne^+$ ions, and 2.4 for the $Ar^+$ ions. The calculated values of the ratio of $E_1/E_0$ using the above values in Equation 3 were 0.920 for He, 0.655 for Ne, and 0.411 for Ar. Referring to FIGURES 3A–3C, the peaks for the $He^+$, $Ne^+$ and $Ar^+$ ion beams appeared to occur at substantially the calculated energy levels. The graphs of FIGURES 3A–3C demonstrate the validity of the low-energy ion scattering analysis of a solid surface of the present invention.

Figure 4A:
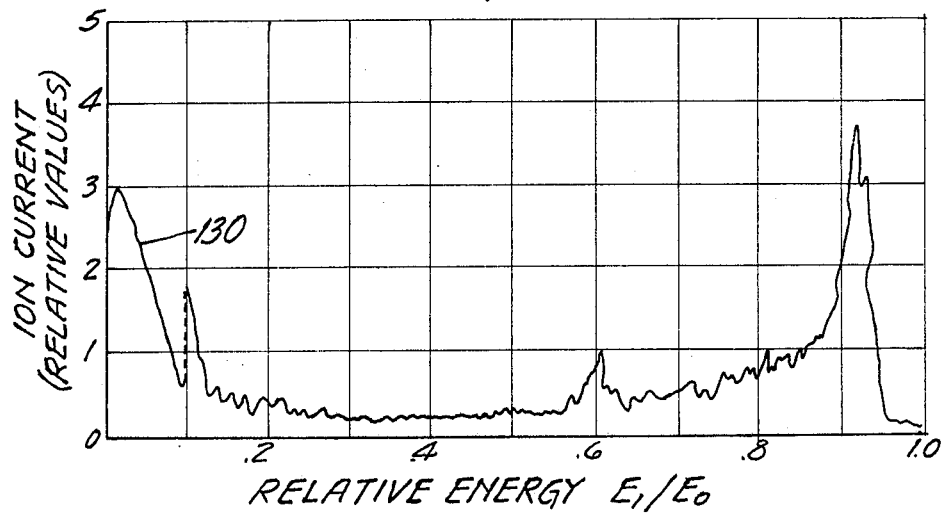
FIGURES 4A and 4B are graphs illustrating analysis of a molybdenum surface having adsorbed gases thereon wherein the vacuum level within a scattering chamber and the sputtering rate of the primary beam is selectively controlled between two levels.
Figure 4B:
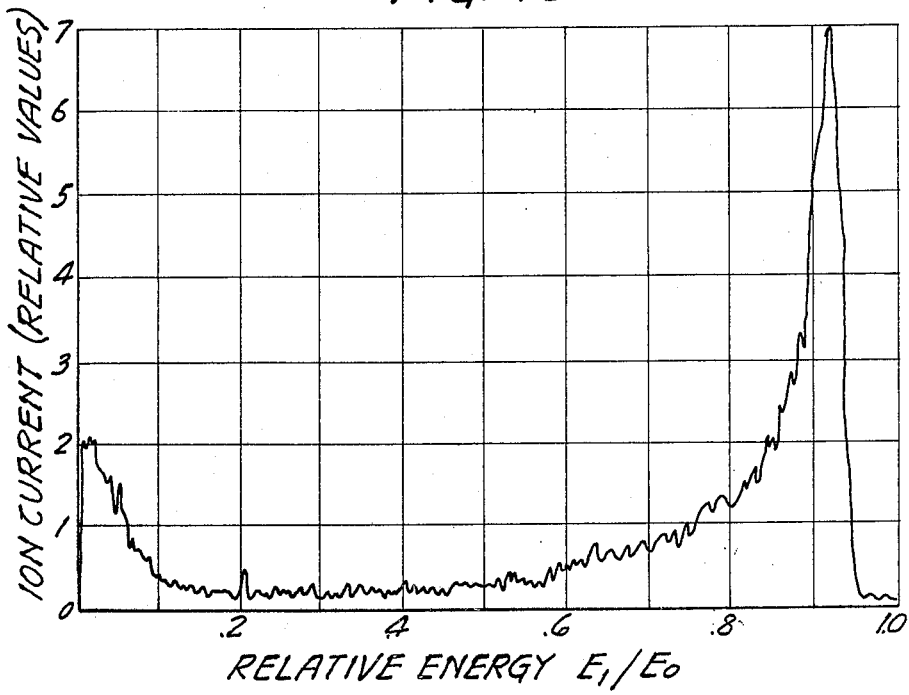

FIGURES 4A and 4B illustrate graphs of typical ion scattering spectra obtained when the molybdenum sample has a surface contamination. The energy spectrum in FIGURE 4A was obtained by selectively contaminating the atmosphere within scattering chamber 70 with carbon monoxide (CO) gas. The CO was admitted to the vacuum system under dynamic pumping conditions through a leak valve. The primary ion beam comprised $He^+$ ions having 1.8 kev. energy and was incident on the molybdenum sample. The angle of scattering $\theta$ was adjusted to 90°.

In FIGURE 4A, the CO gas pressure was increased by a factor of 10 over the conditions for the graph of FIGURE 4B such that the CO gas was adsorbed by the molybdenum surface. The beam current density in FIGURE 4A was also decreased by 10 from the conditions for the graph of FIGURE 4B.

The graphs of FIGURES 4A and 4B were obtained by plotting the scattered ion current as a function of relative energy $E_1/E_0$. The portion of the graph of FIGURE 4A below $E_1/E_0$ 0.1 and identified as 130 was plotted with the sensitivity of the recorder decreased by a factor of 5. The spectrum clearly shows that when the surface of molybdenum is deliberately contaminated by adsorption of less than a monolayer of gas, there is a decrease in the molybdenum peak and an increase in the low-energy sputtered peak. Also, a small peak occurs when $E_1/E_0 = 0.6$ indicating the presence of oxygen on the surface.

However, when the CO gas pressure is decreased by a factor of 10 and the beam current density increased by a factor of 10, the primary ion beam is sufficiently intense to sputter the CO gas atoms from the surface and consequently a relatively clean molybdenum surface is maintained. The large ratio of high-energy molybdenum peak (at $E_1/E_0 = 0.9$) to the low-energy sputtered peak indicates the relatively clean molybdenum surface.

Thus, it is apparent that the ion scattering technique can be used for measuring gas adsorption on a solid surface. In the above example, the scattering of 1.8 kev. $He^+$ ions was used to directly observe the adsorption of CO on polycrystalline molybdenum and the sputtering of CO from the surface by the primary ion beam. Additionally, this technique can be used to determine the efficiency of sputtering of gas atoms by the primary ion beam.

Tests were also conducted in a background CO pressure of about $3 \times 10^{-8}$ torr using the molybdenum target. The molybdenum target is flash heated to about 1600° K. by passing current through the traget for approximately 3 seconds. This heating causes flash desorption of the target to produce an atomically clean molybdenum surface even in the contaminated atmosphere. The counting rate of $He^+$ ions scattered from the molybdenum sample at $E_1/E_0 = 0.9$ is plotted as a function of time after flash desorptions in the graph of FIGURE 5.

FIGURE 5 shows the counting rate of $He^+$ ions scattered from the molybdenum surface and the counting rate of low-energy sputtered gas ions plotted as a function of time after flash desorption for two values of primary ion current density of $10^{14}$ ion/cm.$^2$ sec. or 10 $\mu A./cm.^2$, solid line curves 120 and 122, and $10^{15}$ ions/cm.$^2$ sec. or 100 $\mu A./cm.^2$, dashed line curves 124 and 126. With a primary ion current of $10^{14}$ ions/cm.$^2$ sec., the counting rate of $He^+$ ions scattered from the molybdenum surface is designated as curve 120. The counting rate of low energy sputtered CO gas ions for the same primary ion beam is designated as curve 122. Curve 124 is the counting rate of $He^+$ ions for a primary ion current of $10^{15}$ ions/cm.$^2$ sec. from the molybdenum surface. Curve 126 is the counting rate of low-energy sputtered CO gas ions at the higher primary ion current density.

When the molybdenum sample is flashed at time $T = 0$, the $He^+$ ion beam is initially scattered from an atomically clean molybdenum surface. Thus, both curves 120 and 124 start out at the same value independent of primary ion current density. However, both curves 120 and 124 then decay, at different rates, to a steady state value. Both the rate of decay and the final steady state values are functions of the primary ion current density. From curves 120 and 124, it appears that the primary ion beam having the higher current density maintains the surface cleaner for a longer period and is able to maintain a higher sputtering rate to remove the adsorbed CO gas.

Similarly, the ion energy distribution ascribed to the adsorbed CO gas atoms, as evidenced by curves 122 and 126, is initially at a fairly low value when the surface is clean at time T=0. However, the adsorption of CO gas atoms by the molybdenum surface continues until a steady state value is attained. The rate of adsorption and the steady state values of adsorbed CO gas atoms again are functions of pressure and are dependent on the primary ion current density.

Thus, the combined effects of surface contamination and ion beam current densities on the time dependent scattering of the ion beam are demonstrated and are measurable with this analytical technique. The rate of surface contamination increases with an increase in pressure and decreases with an increase of primary ion current density. Thus, by observing the time rate of change of peaks occurring on an energy spectrum produced by plotting ion beam current as a function of relative energy indicates the dynamic behavior of certain atoms in adsorption process.

If the surface contains adsorbed gas molecules, the sputtering rate or removal of the adsorbed gas molecules can be precisely determined and the thickness of the adsorbed layer can be accurately measured by observing the changing scattered ion energy distributions associated with the various atoms on the surface. In many cases, this can be predicted uniquely by a simple binary collision model.

The low-energy ion scattering analysis of the present invention also permits one to analyze a solid surface with a relatively low-energy ion beam such that very little sputtering of the surface occurs during a measurement. The minimum low-energy level of the scattered ion beam such that very little sputtering of the surface occurs during a measurement. The minimum low-energy level of the scattered ion beam occurs when the simple two-body elastic collision is replaced by a more complicated three-body collision or effect. The three-body effect occurs when the detected primary ion beam appears to interact with more than one target atom. Then the whole solid surface or at least two or more atoms cause the ions to scatter. Although a sharp demarcation does not exist between the classical two-body collision and a three-body collision, the lower limitation would appear to be where ions are scattered at an angle $\theta$ from the solid surface at other than a predetermined scattering energy predicted by Equation 1 or 2.

Figure 6:
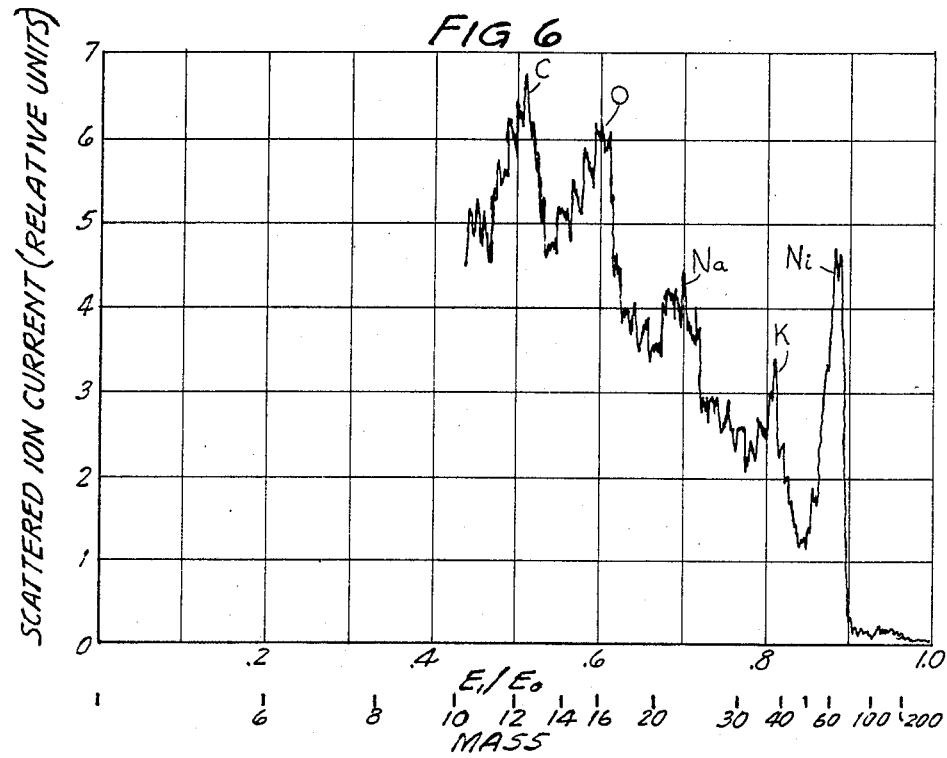
FIGURE 6 is a graph illustrating an energy distribution of scattered ions plotted as a function of the atomic mass of atoms contaminating a nickel target surface wherein the surface atomic composition comprises a plurality of atoms.

To further illustrate the broad scope of the apparatus and method of the present invention, the following additional examples are included. The graph of FIGURE 6 illustrates an energy spectrum which is obtained by plotting scattered ion current directly as a function of mass of the surface atoms. For purpose of reference, the energy ratio of scattered ions to the primary ion beam is shown. In this example, a nickel target was bombarded by He+ ion beam having an energy of 1.8 kev. and a current density of approximately 1 $\mu$A./cm.$^2$. The predetermined angle $\theta$ was equal to 90°. The resulting energy spectrum has a plurality of peaks representative of the masses of several surface atoms. In this particlar example, the graph of FIGURE 6 illustrates the presence of carbon (C) (mass 12), oxygen (O) (mass 16), sodium (Na) (mass 23), and potassium (K) (mass 39) on the surface of the nickel (Ni) sample (mass 59).

In the above example, a He+ ion beam was selected because its mass permitted the energy spectrum to be expanded about a predetermined number of masses, for example, masses from about 10 to about 40. By proper selection of the primary ion beam, the mass scale can be expanded at different mass values.

In this example, the primary ion current density was substantially constant. However, it may be desirable to selectively change the primary ion beam current density during generation of the energy spectrum. In such a case, the energy peak heights would correspondingly increase or decrease. Interpretation of the energy spectrum would be based upon the changed primary ion current density in that a peak would occur in the energy spectrum due to the current density being selectively varied. It is appreciated that the above example and its associated graph of FIGURE 6 discloses one application of the apparatus and method of the present invention when a two-body collision occurs between the primary ion beam and the target surface.

As discussed herein, the apparatus and method of the present invention can also be utilized for certain applications even when a three-body effect occurs. One such use is as a low-energy ion scattering surface contamination monitor. In this application, the energy of the primary ions scattered from a particular species of surface atoms known to be present in the target surface is determined. If necessary, the energy of the scattered primary ions can be determined empirically and does not depend on any precise knowledge of the collision between the primary ion beam and the target surface. Thus, a very low-energy primary ion beam can be used for this determination and energies down to in the order of about 50 ev. can be used for this purpose. An ion source suitable for this application is described in an article entitled "Ion Gauge for Vacuum Pressure Measurements Below $1 \times 10^{-10}$ torr" by J. C. Helmer and W. H. Hayward, published in The Review of Scientific Instruments, volume 37, No. 12, pages 1652–1654, December 1966 and also the references cited therein.

Figure 7:
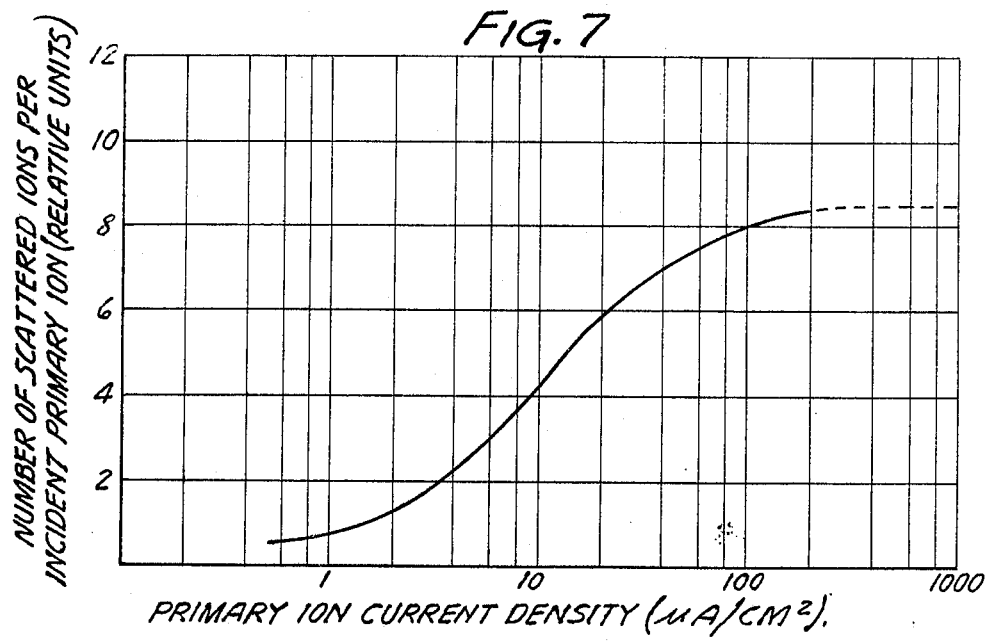
FIGURE 7 is a graph illustrating the number of helium ions scattered from a nickel target plotted as a function of primary ion current density.

Yet another surface contamination monitor is possible using the teachings of this invention. In one example, a nickel target having a contaminated surface was to be made atomically clean by a known surface cleaning process. The apparatus and method of the present invention were used to determine if the nickel surface was in fact atomically clean after the cleaning process. FIGURE 7 is a graph plotting the number of helium ions scattered from the uncleaned nickel surface plotted as a function of primary ion current density prior to cleaning. In the graph of FIGURE 7, the primary ion current density was initially adjusted to a relatively high value generally in the plateau area of the graph of FIGURE 7, for example, a primary ion current density of 100 $\mu$A./cm.$^2$. Such a primary ion current density is sufficient to make an atomically clean spot on the nickel surface. The number of scattered ions of the primary ion beam being scattered from the nickel surface at this particular current density is considered a clean surface signal. In this example, the total current remained constant and the current density was reduced to a substantially lower value, such as for example to about 1 $\mu$A./cm.$^2$, by defocusing the beam to increase the beam cross-section. Also, the current density could be decreased by decreasing the ion beam current. In any event, the number of ions scattered from the uncleaned nickel surface was relatively low compared to the number of ions which produced the clean surface signal. The nickel surface was cleaned by the cleaning process to produce the desired atomically clean surface. After the target surface was cleaned, the nickel target was checked by the low-energy ion beam technique to determine if in fact the nickel surface was atomically clean. The cleaned target was bombarded with the primary ion beam having the low current density obtained by enlarging the cross-section of the beam. The total number of scattered ions at the low current density was measured to be the same number of scattered ions which was originally detected at the higher primary ion current density (i.e. 100 $\mu$A./cm.$^2$), or what was originally referred to as the clean surface signal. If the absolute value of the ion beam current were decreased, the resulting number of scattered ions related to the clean surface signal would need to be adjusted to reflect the decrease in ion current. In this particular case, the existence of an atomically clean surface was clearly evidenced by measuring substantially the same number of scattered ions at the low current density as was originally measured at the high current density. Thus, this technique provides a simple, inexpensive apparatus and method for monitoring the efficiency of a treatment process for treating the target surface.

Other significant uses of the low-energy ion scattering technique include monitoring surface deposition processes such as the processes used in the manufacture of thin films for optical and electronic applications. By suitable calibration of the low-energy ion scattering apparatus, the composition of surfaces can be determined with a depth resolution of about one monomolecular layer. Additional uses of this technique include measurement of condensation rates, adsorption rates, diffusion rates, sputtering rates and the like.

In summary, the low-energy scattered ion beam analysis can be utilized for identifying and determining the abundance of each element on a solid surface without substantial destruction of that surface. By increasing the energy level of the primary ions to the level where a monolayer of adsorbed molecules can be selectively sputtered, successive monolayers of gas molecules can be selectively analyzed without subjecting the entire surface to a deeply penetrating ion beam. For example, if the solid surface has a layer of adsorbed gas molecules, say for example in the order of several angstroms thickness, a low-energy ion beam, having a potential which is less than about 3 kev., can be used to precisely measure the thickness of the adsorbed layer. Also, the technique of the present invention has other utilities. For example, the sputtering rate or removal rate of a contamination layer can be determined. When the sputtering rate is known, the time required to sputter the surface from the solid can be precisely determined or vice versa. By observing the energy spectrum during this process, the relative magnitude and shifts in the various energy peaks indicates when the contaminated layer has been removed.

Any modifications, improvements, uses and the like using the teachings of the present invention are deemed within the scope of the appended claims.

What is claimed is:

1. An apparatus for determining the elemental composition of a solid surface by measuring the energy and the quantity of primary ions scattered from elements forming said solid surface and received by an analyzer positioned adjacent to said surface to thereby selectively identify said elements and determine the quantity of each said element respectively, said apparatus comprising:
    (a) a source of noble gas;
    (b) generating means operatively connected to said source of noble gas for producing a beam of primary ions wherein said primary ions have a known mass and substantially the same known kinetic energy, which energy value is less than about 10 kev.;
    (c) directing means for directing said beam of primary ions along a predetermined path toward said surface to be analyzed whereby said primary ions will collide with said elements forming said surface and scatter therefrom;
    (d) an analyzer positioned adjacent to said surface, said analyzer comprising
        (1) entrance means for receiving primary ions scattered from said surface at a predetermined angle from said predetermined path,
        (2) analyzing means for transmitting primary ions received by said entrance means which have a second known kinetic energy value less than the original kinetic energy of said primary ions to measure the energy lost as a result of collision with said surface to identify the atomic mass of the element scattering said primary ions, and
        (3) detector means for detecting said primary ions having said second kinetic energy and transmitted by said analyzing means by generating electrical pulses,
    (e) counting means for receiving said pulses and generating an output signal representative of the number of said transmitted primary ions during a first predetermined time interval to determine the quantity of a said element on said surface; and
    (f) means connected to said analyzing means for causing said analyzing means to measure received primary ions having another known kinetic energy value different from said second known energy during a second predetermined time interval to identify another element by measuring the energy lost by the primary ions and determining the quantity of another element whereby a spectrum may be developed by measuring the energy lost by the scattered primary ions as a result of collisions with the elements forming the surface and the quantity of ions of the different energy values to identify the elements and determine the quantity of the elements forming a said surface.

2. An apparatus for determining the elemental composition of a solid surface, as defined in claim 1, wherein said directing means includes purifying means for rejecting said primary ions in said beam having other than a known charge and for rejecting said primary ions varying from said known mass and kinetic energy to afford transmission of primary ions having known mass, charge and kinetic energy.

3. An apparatus for determining the elemental composition of a solid surface as defined in claim 2 wherein said purifying means includes a sector magnetic separator.

4. An apparatus for determining the elemental composition of a solid surface, as defined in claim 1, wherein said directing means includes focusing means for selective focusing of the primary ion beam onto said solid surface to vary the primary ion current density bombarding said surface.

5. An apparatus for determining the elemental composition of a solid surface, as defined in claim 1, wherein
    (a) said analyzing means includes electrostatic analyzer plates; and
    (b) said means connected to said analyzing means includes a power supply means for applying predetermined electrical potentials to said analyzer plates.

6. An apparatus for determining the elemental composition of a solid surface, as defined in claim 5, wherein said detector means includes an electron multiplier to generate electrical pulses.

7. An apparatus for determining the elemental composition of a solid surface, as defined in claim 6, wherein said apparatus includes a display means, operatively connected to said counting means and said power supply means, for generating an energy spectrum in response to analog signals from said power supply means and output signals from said counting means wherein the peaks in said energy spectrum can be directly related to the atomic mass and the quantity of each said element forming said solid surface.

8. An apparatus for determining the elemental composition of a solid suface, as defined in claim 7 wherein said apparatus includes a rotatable support having a plurality of separate target supports each of which is capable of having a target placed thereon, said rotatable support being adapted to be selectively rotated to position each target support relative to said focusing means to have said primary ion beam directed onto a said target for surface analysis thereof.

9. A method for determining the elemental composition of a solid surface by measuring the energy and the quantity of primary ions scattered from elements forming said solid surface and received by an analyzer positioned adjacent to said surface to thereby selectively identify said elements and determine the quantity of each said element respectively, said method comprising the steps of:
(a) supplying a source of noble gas;
(b) producing a beam of primary ions from said gas wherein said primary ions have a known mass and substantially the same kinetic energy, which energy value is less than about 10 kev.;
(c) directing said beam of primary ions along a predetermined path toward a said surface to be analyzed whereby said primary ions will collide with the elements forming said surface and scatter therefrom;
(d) analyzing primary ions scattered from said elements by
(1) receiving primary ions scattered from said surface at a predetermined angle from said predetermined path,
(2) transmitting received primary ions which have a second kinetic energy value less than the original kinetic energy of said primary ions to measure the energy lost as a result of the collision with said surface to identify the atomic mass of the element scattering said primary ions, and
(3) detecting said transmitted primary ions having said second kinetic energy by generating electrical pulses,
(e) receiving said pulses to generate output signals to count said transmitted primary ions during a first predetermined time interval to determine the quantity of a said element on said surface; and
(f) transmitting received primary ions having another known kinetic energy value different from said second known energy during a second predetermined time interval to identify another element by measuring the energy lost by the primary ions and determining the quantity of another element whereby a spectrum may be developed by measuring the energy lost by the scattered primary ions as a result of collisions with the element or elements forming the surface and the quantity of ions of the different energy values to identify the elements and determine the quantity of the elements forming a said surface.

10. A method for determining the elemental composition of a solid surface, as defined in claim 9 wherein said directing step includes the step of purifying said primary ions by rejecting said primary ions in said beam having other than a known mass, charge and kinetic energy to afford transmission of said primary ions having known mass, charge and kinetic energy.

11. A method for analyzing the physical properties of a solid surface with a low-energy ion beam comprising the steps of
generating a low-energy ion beam substantially homogeneous in mass and energy having a predetermined energy level which is less than about 3 kev.;
concentrating said ion beam to increase the current density thereof;
directing said concentrated ion beam onto said solid surface whereby ions from said primary ion beam are scattered from said solid surface, said concentrated ion beam being directed onto said solid surface for a sufficiently long time interval to render the portion of said surface bombarded by said concentrated ion beam atomically clean whereby a predetermined number of ions from said ion beam are scattered from said atomically clean surface portion;
decreasing the current density of said ion beam such that a low number of scattered ions of the primary beam are scattered from said solid surface;
treating said solid surface by a process; and
monitoring said treated surface by counting the number of scattered ions from said decreased ion beam whereby the number of ions scattered from said decreased ion beam relative to said predetermined number of ions from said concentrated ion beam indicates the efficiency of said treating process.

12. A method for analyzing the outer surface of a solid by scattering a low-energy ion beam from the solid surface comprising the steps of
generating a low-energy ion beam inhomogeneous in mass and substantially homogeneous in energy;
directing said ion beam along a preselected path;
purifying said ion beam to render said mass homogeneous while rejecting ions of all other masses and energies to produce an ion beam homogeneous in mass and energy;
directing said ion beam along said preselected path onto said solid surface to be analyzed whereby ions from said ion beam are scattered from said surface;
measuring at a predetermining angle relative to said ion beam and during a predetermined time interval the loss of energy of scattered ions;
counting the number of said scattered ions having said measured energy loss; and
producing an energy spectrum by plotting the counted number of said scattered ions having said measured energy loss as a function of the ratio of the energy of said scattered ions having said measured energy loss to said ion beam.

References Cited

UNITED STATES PATENTS 2,947,868   8/1960   Herzog _____ 250—49.59

OTHER REFERENCES

Moss-Spectrometric Micro-Surface Analysis, Herzog, page 5, 1963, 250–49.5(5).

Proceedings—Fourth Symposium On Electron Beam Technology, Ogilvie, 1962, pp. 299–303, 250–49.5(8).

RALPH G. NILSON, Primary Examiner

A. L. BIRCH, Assistant Examiner

U.S. Cl. X.R.

250—41.9

PO-1050
(5/69)

UNITED STATES PATENT OFFICE
CERTIFICATE OF CORRECTION

Patent No. 3,480,774　　　　　　　　Dated November 25, 1969

Inventor(s)　　　DAVID P. SMITH

It is certified that error appears in the above-identified patent and that said Letters Patent are hereby corrected as shown below:

Column 2, line 62, change "identify" to --identifying--; Column 4, line 16, change "atomsphere" to --atmosphere--; Column 5, line 49, change "Equation 1" to --EQN (1)--; Column 5, line 72, change "bombardement" to --bombardment--; Column 9, line 30, delete "The"; Column 9, line 41, change "enetrgy" to --energy--; Column 10, line 47, change "traget" to --target--; Column 16, line 35, change "predetermining" to --predetermined--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents